US010059457B2

(12) United States Patent
Klimpel et al.

(10) Patent No.: US 10,059,457 B2
(45) Date of Patent: Aug. 28, 2018

(54) AIRCRAFT AIR CONDITIONING SYSTEM AND METHOD OF OPERATING AN AIRCRAFT AIR CONDITIONING SYSTEM

(71) Applicant: Airbus Operations GmbH, Hamburg (DE)

(72) Inventors: Frank Klimpel, Hamburg (DE); Enrico Klausner, Dresden (DE); Uwe Gampe, Bad Gottleuba (DE); Steffen Golle, Dresden (DE); Mario Raddatz, Coswig (DE); Ullrich Hesse, Affalterbach (DE)

(73) Assignee: Airbus Operations GmbH, Hamburg (DE)

( * ) Notice: Subject to any disclaimer, the term of this patent is extended or adjusted under 35 U.S.C. 154(b) by 480 days.

(21) Appl. No.: 14/322,053

(22) Filed: Jul. 2, 2014

(65) Prior Publication Data
US 2015/0013355 A1 Jan. 15, 2015

(30) Foreign Application Priority Data
Jul. 4, 2013 (EP) .................................... 13175020

(51) Int. Cl.
*B64D 13/02* (2006.01)
*B64D 13/08* (2006.01)
*B64D 13/06* (2006.01)

(52) U.S. Cl.
CPC ............. *B64D 13/08* (2013.01); *B64D 13/06* (2013.01); *B64D 2013/0674* (2013.01); *B64D 2013/0688* (2013.01); *Y02T 50/56* (2013.01)

(58) Field of Classification Search
CPC ................ B64D 13/06; B64D 13/08; B64D 2013/0674; B64D 2013/0688; B64D 13/02; Y02T 50/56
See application file for complete search history.

(56) References Cited

U.S. PATENT DOCUMENTS 2,851,254 A * 9/1958 Messinger ............. B64D 13/04
165/216
3,153,331 A * 10/1964 Rogers ................... B64D 13/06
62/117
(Continued)

FOREIGN PATENT DOCUMENTS

DE 102008053320 5/2010
DE 102010034831 4/2011
(Continued)

OTHER PUBLICATIONS

European Search Report, dated Oct. 12, 2013.

*Primary Examiner* — Frantz Jules
*Assistant Examiner* — Martha Tadesse
(74) *Attorney, Agent, or Firm* — Greer, Burns & Crain Ltd.

(57) ABSTRACT

An aircraft air conditioning system comprising an ambient air supply line allowing a flow of ambient air therethrough, an ambient air cooling device to cool the air flowing through the ambient air supply line, and a discharge line connected to the ambient air cooling device and an aircraft cabin. A compressed air supply line allows a flow of compressed air therethrough, a compressed air cooling device is connected to the compressed air supply line to cool the air flowing through the compressed air supply line, and a discharge line is connected to the compressed air cooling device and to the aircraft cabin. A refrigerant circuit allows the flow of a two-phase refrigerant therethrough and converts the two-phase refrigerant from the liquid state into the gaseous state of aggregation and thereafter back again. The refrigerant circuit supplies cooling energy to the ambient air cooling device and the compressed air cooling device.

19 Claims, 2 Drawing Sheets

(56) References Cited

U.S. PATENT DOCUMENTS

| | | | |
|---|---|---|---|
| 4,262,495 A | 4/1981 | Gupta et al. | |
| 4,430,867 A * | 2/1984 | Warner | B60H 1/32 62/172 |
| 4,966,005 A * | 10/1990 | Cowell | B64D 13/06 62/172 |
| 5,086,622 A * | 2/1992 | Warner | B64D 13/06 62/172 |
| 5,299,763 A * | 4/1994 | Bescoby | B64D 13/06 244/118.5 |
| 5,704,218 A * | 1/1998 | Christians | B64D 13/06 62/172 |
| 5,860,283 A * | 1/1999 | Coleman | B64D 13/06 62/402 |
| 5,921,093 A * | 7/1999 | Jonqueres | B64D 13/06 62/402 |
| 6,128,909 A * | 10/2000 | Jonqueres | B64D 13/06 62/402 |
| 6,148,622 A * | 11/2000 | Sanger | B64D 13/06 62/402 |
| 6,182,435 B1 * | 2/2001 | Niggemann | B64D 41/00 60/266 |
| 6,427,471 B1 * | 8/2002 | Ando | B64D 13/06 62/402 |
| 6,948,331 B1 * | 9/2005 | Ho | B64D 13/06 62/401 |
| 7,171,819 B2 * | 2/2007 | Lui | B64D 13/06 454/71 |
| 7,305,842 B1 * | 12/2007 | Schiff | B64D 13/06 62/244 |
| 8,365,550 B2 * | 2/2013 | Vogel | B64D 13/06 454/74 |
| 2004/0188360 A1 * | 9/2004 | Armstrong | F02C 3/10 210/774 |
| 2004/0195447 A1 * | 10/2004 | Claeys | B64D 13/06 244/118.5 |
| 2006/0059942 A1 * | 3/2006 | McAuliffe | B64D 13/06 62/402 |
| 2007/0193301 A1 * | 8/2007 | Andres | B64D 13/06 62/498 |
| 2008/0314060 A1 | 12/2008 | Parikh | |
| 2009/0117840 A1 * | 5/2009 | Kresser | B64D 13/06 454/71 |
| 2010/0101251 A1 | 4/2010 | Kelnhofer | |
| 2011/0283713 A1 | 11/2011 | Kelnhofer | |
| 2013/0160472 A1 * | 6/2013 | Klimpel | B64D 13/08 62/87 |

FOREIGN PATENT DOCUMENTS

| | | | |
|---|---|---|---|
| DE | 102010054448 | 6/2012 | |
| EP | 1386837 A1 * | 2/2004 | B64D 13/06 |
| WO | 2012022758 | 2/2012 | |
| WO | 2012079756 | 6/2012 | |

* cited by examiner

AIRCRAFT AIR CONDITIONING SYSTEM AND METHOD OF OPERATING AN AIRCRAFT AIR CONDITIONING SYSTEM

CROSS-REFERENCES TO RELATED APPLICATIONS

This application claims the benefit of the European patent application No. 13 175 020.0 filed on Jul. 4, 2013, the entire disclosures of which are incorporated herein by way of reference.

BACKGROUND OF THE INVENTION

The present invention relates to an aircraft air conditioning system and a method of operating an aircraft air conditioning system.

So-called air-based air conditioning systems, as described for example in DE 10 2008 053 320 A1 and US 2010/101251 A1 or DE 10 2010 054 448 A1 and WO 2012/079756 A2, are usually used at present in commercial aircraft to air-condition the aircraft cabin. An aircraft air conditioning system serves to adequately cool or heat the aircraft cabin and to adequately supply fresh air into the aircraft cabin to ensure that a prescribed minimum proportion of oxygen is present in the aircraft cabin. Further, the humidity within the aircraft cabin is adjusted by means of the aircraft air conditioning system. Moreover, during flight operation of the aircraft, the aircraft air conditioning system is used to pressurize the aircraft cabin so as to maintain the pressure within the aircraft cabin, compared to the ambient pressure at the cruising altitude of the aircraft, at an elevated level.

Air-based air conditioning systems typically comprise an air conditioning unit, which is arranged, for example, in a wing root of the aircraft, and which is supplied with compressed process air that is generated by a compressor or bled off from an engine or an auxiliary power unit (APU) of the aircraft. During flight operation of the aircraft, usually engine bleed air is used so as to supply the air conditioning unit of the aircraft air conditioning system with compressed process air. During ground operation of the aircraft the air conditioning unit of the aircraft air conditioning system, however, typically is supplied with compressed process air from the auxiliary power unit of the aircraft. In the air conditioning unit, the process air, upon flowing through at least one heat exchanger as well as through various compression and expansion units, is cooled and expanded. Cooled process air exiting the air conditioning unit finally is supplied to a mixing chamber where it is mixed with recirculation air recirculated from an aircraft region to be air conditioned. The mixed air from the mixing chamber, via respective mixed air lines, is supplied to the aircraft region to be air conditioned which may be divided into a plurality of air conditioning zones.

DE 10 2010 034 831 A1 and WO 2012/022758 A1 describe an aircraft air conditioning system, wherein compressed process air that is bled off from an engine of the aircraft is cooled by transferring heat to a refrigerant circulating through a refrigerant circuit. A turbine which serves to expand the compressed process air prior to being directed into an aircraft cabin is used to drive a compressor disposed in the refrigerant circuit.

SUMMARY OF THE INVENTION

The invention is directed at an object of specifying an aircraft air conditioning system which is operable with high energy efficiency. Further, the invention is directed at the object of providing a method of operating an aircraft air conditioning system of this kind.

An aircraft air conditioning system comprises an ambient air supply line allowing a flow of ambient air therethrough. The ambient air supply line may be directly connected to the ambient atmosphere. For example, an opening may be provided in an aircraft outer skin via which the ambient air might be supplied to the ambient air supply line. It is, however, also conceivable that the ambient air supply line branches off from a further ambient air conducting line or a ram air channel. The supply of ambient air into the ambient air supply line may be controlled by a suitable valve. The aircraft air conditioning system further comprises an ambient air cooling device which is connected to the ambient air supply line and which is adapted to cool the ambient air flowing through the ambient air supply line. For example, the ambient air cooling device may comprise a heat exchanger which allows cooling energy to be transferred to the ambient air flowing through the ambient air supply line. An ambient air discharge line of the aircraft air conditioning system is connected to the ambient air cooling device and is connectable to an aircraft cabin. It is thus possible to supply ambient air cooled by the ambient air cooling device to the aircraft cabin.

Further, the aircraft air conditioning system comprises a compressed air supply line allowing a flow of compressed air therethrough. The compressed air supply line may be connected to an engine or an auxiliary power unit of the aircraft. It is, however, also conceivable supply compressed air provided from an air compressor to the compressed air supply line. The supply of compressed air into the compressed air supply line may be controlled by a suitable valve. A compressed air cooling device is connected to the compressed air supply line and is adapted to cool the compressed air flowing through the compressed air supply line. For example, the compressed air cooling device may comprise a heat exchanger which allows cooling energy to be transferred to the compressed air flowing through the compressed air supply line. A compressed air discharge line is connected to the compressed air cooling device and is connectable to the aircraft cabin. It is thus possible to supply also compressed air cooled by the compressed air cooling device to the aircraft cabin.

Finally, the aircraft air conditioning system comprises a refrigerating apparatus which comprises a refrigerant circuit allowing the flow of a two-phase refrigerant therethrough. The refrigerating apparatus is designed to convert the two-phase refrigerant, upon flowing through the refrigerant circuit, from the liquid state of aggregation into the gaseous state of aggregation and thereafter again back from the gaseous state of aggregation into the liquid state of aggregation. In other words, the two-phase refrigerant which circulates in the refrigerant circuit of the refrigerating apparatus is a refrigerant, which, upon releasing cooling energy to a cooling energy consumer, is converted from the liquid to the gaseous state of aggregation and is then converted back to the liquid state of aggregation. The two-phase refrigerant may, for example, be R134A (CH2F-CF3), CO2, R-245fa (1,1,1,3,3-Pentafluoropropane), or a low pressure HFC refrigerant.

The refrigerant circuit of the refrigerating apparatus is adapted to supply cooling energy to the ambient air cooling device and the compressed air cooling device. In the aircraft air conditioning system, the ambient air flowing through the ambient air supply line and the compressed air flowing through the compressed air supply line thus constitute cooling energy consumers which are supplied with the cooling energy released upon converting the two-phase refrigerant flowing through the refrigerant circuit of the refrigerating apparatus from the liquid state of aggregation to the gaseous state of aggregation.

In an aircraft which is equipped with the aircraft air conditioning system described above, the aircraft cabin is supplied not only with cooled compressed air but also with cooled ambient air, lowering the amount of compressed air which has to be provided to sufficiently air condition the aircraft cabin. In particular in case the compressed air is bled of from an engine or an auxiliary power unit of the aircraft, the fuel consumption of the aircraft thus can be reduced. Further, by supplying the aircraft cabin with cooled ambient air, the required fresh air supply into the aircraft cabin can be ensured. Moreover, due to the high cooling capacity of the refrigerating apparatus being operated with a two-phase refrigerant, the aircraft air conditioning system may be operated with particularly high energy efficiency. Finally, the aircraft air conditioning system does not require an adjustment of already existing interfaces between a compressed air system including the compressed air supply line as well as the compressed air discharge line and the aircraft. Hence, aircraft which are designed for being operated with a conventional air-based air conditioning system can be equipped with the aircraft air conditioning system according to the invention without the need to change already existing interfaces.

The refrigerant apparatus of the aircraft air conditioning system may comprise a refrigerant compressor for compressing the two-phase refrigerant circulating through the refrigerant circuit of the refrigerating apparatus. The refrigerant compressor may, for example, be designed in the form of a radial compressor. Further, the refrigerant apparatus may comprise a refrigerant liquefier for liquefying the two-phase refrigerant circulating through the refrigerant circuit of the refrigerating apparatus.

Preferably, the refrigerant liquefier is thermally coupled to a ram air channel such that heat energy from the refrigerant liquefier may be transported to ram air flowing through the ram air channel. For example, the refrigerant liquefier may be designed in the form of a heat exchanger which is disposed in the ram air channel.

Moreover, the refrigerant apparatus may comprise a refrigerant storage container which may be disposed in the refrigerant circuit of the refrigerating apparatus downstream of the refrigerant liquefier. The term "downstream" in this context refers to the direction of flow of the refrigerant flowing through the refrigerant circuit of the refrigerating apparatus. The refrigerant storage container serves to receive and store refrigerant exiting the refrigerant liquefier in the liquid state of aggregation.

In a preferred embodiment of the aircraft air conditioning system, at least one of the ambient air cooling device and the compressed air cooling device is designed in the form of a refrigerant evaporator disposed in the refrigerant circuit of the refrigerant apparatus. For example, the ambient air cooling device may comprise a heat exchanger wherein the ambient air flowing through the ambient air supply line and the two-phase refrigerant circulating through the refrigerant circuit of the refrigerating apparatus are bought into thermal contact with each other. Upon flowing through the heat exchanger of the ambient air cooling device, the two-phase refrigerant is converted from the liquid state of aggregation to the gaseous state of aggregation and thereby releases cooling energy to the ambient air supplied to the ambient air cooling device via the ambient air supply line. Preferably, the ambient air cooling device is disposed in the refrigerant circuit of the refrigerant apparatus downstream of a first expansion valve. Again, in this context, the term "downstream" refers to the direction of flow of the refrigerant flowing through the refrigerant circuit of the refrigerating apparatus.

Similarly, the compressed air cooling device may comprise a heat exchanger wherein the compressed air flowing through the compressed air supply line and the two-phase refrigerant circulating through the refrigerant circuit of the refrigerating apparatus are bought into thermal contact with each other. Upon flowing through the heat exchanger of the compressed air cooling device, the two-phase refrigerant is converted from the liquid state of aggregation to the gaseous state of aggregation and thereby releases cooling energy to the compressed air supplied to the compressed air cooling device via the compressed air supply line. Preferably, the compressed air cooling device is disposed in the refrigerant circuit of the refrigerant apparatus downstream of a second expansion valve. Again, in this context, the term "downstream" refers to the direction of flow of the refrigerant flowing through the refrigerant circuit of the refrigerating apparatus.

The refrigerating apparatus may comprise a control unit which is adapted to control the operation of the refrigerant apparatus, i.e. the refrigerant compressor, the refrigerant liquefier, the expansion valves and the refrigerant evaporators such that the cold vapor process executed in the refrigerating apparatus substantially is executed in the two-phase area of the refrigerant, whereby the isothermals and the isobars coincide. As a result, a process converges to the theoretical optimum Carnot process. This allows the efficiency and the cooling capacity of the refrigerating apparatus to be optimized.

The aircraft air conditioning system may further comprise a condenser disposed in the compressed air discharge line. The condenser serves to further cool the compressed air exiting the compressed air cooling device. Further, a water separator may be disposed in the compressed air discharge line downstream of the condenser. For example, the water separator may be designed in the form of a high pressure separator and may disposed in the ambient air discharge line downstream of the ambient air cooling device so as to remove liquid water condensed from the compressed air stream upon being cooled in the compressed air cooling device. In this context, the term "downstream" refers to the direction of flow of the compressed air flowing through the compressed air discharge line. Liquid water removed from the compressed air stream in the water separator may be discharged into the ram air channel so as to be discharged to the ambient atmosphere, together with the ram air flowing through the ram air channel.

Finally, a compressed air turbine driven by the compressed air flowing through the compressed air discharge line may be disposed in the compressed air discharge line, preferably downstream of the water separator. In this context, the term "downstream" again refers to the direction of flow of the compressed air flowing through the compressed air discharge line. In the compressed air turbine, compressed air flowing through the compressed air discharge line is expanded to a desired lower pressure. An outlet of the compressed air turbine may comprise a conical axial diffuser or a radial diffuser. The air exiting the compressed air turbine might be guided to the condenser so as to act as a heat sink for the compressed air exiting the compressed air cooling device. Hence, upon flowing through the condenser, the compressed air exiting the compressed air cooling device may be cooled by transferring heat to the air exiting the compressed air turbine.

Preferably, the compressed air turbine is coupled to the refrigerant compressor of the refrigerating apparatus so as to drive the refrigerant compressor of the refrigerating apparatus. In the aircraft air conditioning system the compressed air bled off from an engine or an auxiliary power unit of the aircraft or being provided by a compressor thus is used to drive the refrigerant compressor of the refrigerating apparatus. The compressed air turbine may be specifically designed in dependence on the driving requirements of the refrigerant compressor and hence can be operated with a high efficiency. As a result, less compressed air has to be bled off from the engine or the auxiliary power unit of the aircraft or be provided by the compressor decreasing the fuel consumption of an aircraft equipped with the aircraft air conditioning.

Basically, the compressed air discharge line may be adapted to directly supply the air exiting the compressed air discharge line to the aircraft cabin. Preferably, however, the compressed air discharge line is connectable to the aircraft cabin via a mixing unit, wherein the air exiting the compressed air discharge line is mixed with recirculation air recirculated from the aircraft cabin, before a mixture of air exiting the compressed air discharge line and recirculation air is guided to the aircraft cabin.

Similarly, also the ambient air discharge line may be adapted to directly supply the ambient air flowing through the ambient air discharge line to the aircraft cabin. In a preferred embodiment of the aircraft air conditioning system, the ambient air discharge line, however, opens into the compressed air discharge line such that the ambient air exiting the ambient air discharge line may be supplied to the aircraft cabin via the compressed air discharge line and preferably also a mixing unit. The ambient air discharge line preferably comprises a first ambient air discharge line branch opening into the compressed air discharge line upstream of the compressed air turbine and a second ambient air discharge line branch opening into the compressed air discharge line downstream of the compressed air turbine. In this context, the terms "upstream" and "downstream" refer to the direction of flow of the compressed air flowing through the compressed air discharge line. Via the first ambient air discharge line branch, ambient air flowing through the ambient air discharge line may be supplied to a high pressure region of the compressed air discharge line. To the contrary, the second ambient air discharge line branch serves to guide ambient air flowing through the ambient air discharge line to a low pressure region of the compressed air discharge line.

Since the ambient air flowing through the ambient air supply line and, after having passed the ambient air cooling device, the ambient air discharge line is guided into the ambient air supply line from the environment of the aircraft, the pressure of the ambient air flowing through the ambient air supply line and the ambient air discharge line varies in dependence on the ambient pressure and hence the cruising altitude of an aircraft equipped with the aircraft air conditioning system. The above described design of the ambient air discharge line with a first ambient air discharge line branch opening into a high pressure region of the compressed air discharge line and a second ambient air discharge line branch opening into a low pressure region of the compressed air discharge line, upon supplying the ambient air into the compressed air discharge line, allows to take account for the pressure of the ambient air flowing through the ambient air discharge line.

The aircraft air conditioning system therefore preferably further comprises a control unit which is adapted to control the supply of ambient air flowing through the ambient air discharge line into the first and the second ambient air discharge line branch in dependence on a pressure of the ambient air flowing through the ambient air discharge line. In particular, the control unit may be adapted to provide for a supply of ambient air flowing through the ambient air discharge line into the first ambient air discharge line branch and further into a high pressure region of the compressed air discharge line, if the pressure of the ambient air flowing through the ambient air discharge line exceeds a predetermined threshold value. Further, the control unit may be adapted to provide for a supply of ambient air flowing through the ambient air discharge line into the second ambient air discharge line branch and further into a low pressure region of the compressed air discharge line, if the pressure of the ambient air flowing through the ambient air discharge line is below a predetermined threshold value.

The control unit, however, also may be adapted to control the flow of ambient air through the ambient air discharge line such that the ambient air is partially guided into the first ambient air discharge line branch and further into the high pressure region of the compressed air discharge line and partially guided into the second ambient air discharge line branch and further into the low pressure region of the compressed air discharge line. The ration of ambient air directed into the first and the second ambient air discharge line branch may be determined in dependence on the pressure of the ambient air flowing through the ambient air discharge line. For controlling the flow of ambient air into the first and the second ambient air discharge line branch the control unit, for example, may be adapted to control a suitable valve, such as a three way valve, disposed in the ambient air discharge line.

An ambient air compressor may be disposed in the ambient air supply line of the aircraft air conditioning system. The ambient air compressor may be designed in the form of a radial compressor. In a preferred embodiment of the aircraft air conditioning system, the ambient air compressor is coupled to the compressed air turbine so as to be driven by the compressed air turbine.

Further, an ambient air pre-cooler may be disposed in the ambient air supply line. Preferably, the ambient air pre-cooler is disposed in the ambient air supply line upstream of the ambient air cooling device and serves to pre-cool the ambient air flowing through the ambient air supply line before the ambient air is supplied to the ambient air cooling device. Hence, in this context, the term "upstream" refers to the direction of flow of the ambient air flowing through the ambient air supply line. The ambient air pre-cooler may be thermally coupled to the ram air channel which also serves to provide cool ram air to the refrigerant liquefier of the refrigerating apparatus. Similar to the refrigerant liquefier, the ambient air pre-cooler may be designed in the form of a heat exchanger and may be disposed in the ram air channel.

Moreover, a compressed air pre-cooler may be disposed in the compressed air supply line. Preferably, the compressed air pre-cooler is disposed in the compressed air supply line upstream of the compressed air cooling device and serves to pre-cool the compressed air flowing through the compressed air supply line before the compressed air is supplied to the compressed air cooling device. Hence, in this context, the term "upstream" refers to the direction of flow of the compressed air flowing through the compressed air supply line. The compressed air pre-cooler may be thermally coupled to the ram air channel which also serves to provide cool ram air to the refrigerant liquefier of the refrigerating apparatus. Similar to the refrigerant liquefier, the compressed air pre-cooler may be designed in the form of a heat exchanger and may be disposed in the ram air channel.

During flight operation of the aircraft, the ram pressure building up in a region of an inlet of the ram air channel provides for a supply of ambient air into the ram air channel. To ensure a sufficient flow of ambient air through the ram air channel also during ground operation of the aircraft, a conveying device which may, for example, be designed in the form of a fan or a blower, may be disposed in the ram air channel, for example, downstream of the refrigerant liquefier, the ambient air pre-cooler and the compressed air pre-cooler. The conveying device may be driven by the compressed air turbine.

In a preferred embodiment of the aircraft air conditioning system, the compressed air turbine and the ambient air compressor are disposed on a common shaft allowing the ambient air compressor and the compressed air turbine to be operated at the same speed. A gear arrangement between the compressed air turbine and the ambient air compressor thus can be dispensed with. The compressed air turbine and the refrigerant compressor of the refrigerating apparatus preferably are coupled via a magnetic coupling disposed between a shaft portion carrying the compressed air turbine and preferably also the ambient air compressor and a shaft portion carrying the refrigerant compressor of the refrigerating apparatus. The magnetic coupling allows the refrigerant compressor of the refrigerating apparatus and the compressed air turbine to be operated at the same speed, wherein, however, slip of the magnetic coupling provides for a limitation of the speed of the refrigerant compressor in case a torque input into the refrigerant compressor by the compressed air turbine exceeds a predetermined maximum value.

Preferably, the aircraft air conditioning system comprises an arrangement including the compressed air turbine, the ambient air compressor and the refrigerant compressor which are arranged on a common shaft. This arrangement may be designed in the form of an assembly which is of a compact design and hence requires only a small installation space. The compressed air turbine and the conveying device for conveying ram air through the ram air channel also may be disposed on a common shaft. For example, the assembly including the compressed air turbine, the ambient air compressor and the refrigerant compressor may be connected to a shaft portion carrying the conveying device.

The refrigerant compressor of the refrigerating apparatus may comprise a hermetically sealed housing. Similarly, also at least one of the compressed air turbine, the ambient air compressor and the conveying device for conveying ram air through the ram air channel may comprise a hermetically sealed housing so as to prevent fluid from exiting the housing.

In a method of operating an aircraft air conditioning system, a flow of ambient air is guided through an ambient air supply line. The ambient air flowing through the ambient air supply line is cooled by means of an ambient air cooling device. The ambient air cooled by the ambient air cooling device is supplied into an ambient air discharge line which is connectable to an aircraft cabin. A flow of compressed air is guided through a compressed air supply line. The compressed air flowing through the compressed air supply line is cooled by means of a compressed air cooling device. The compressed air cooled by the compressed air cooling device is supplied into a compressed air discharge line which is connectable to the aircraft cabin. Cooling energy is supplied to the ambient air cooling device and the compressed air cooling device from a refrigerant circuit of a refrigerating apparatus, the refrigerant circuit allowing the flow of a two-phase refrigerant therethrough, and the refrigerating apparatus being designed to convert the two-phase refrigerant upon flowing through the refrigerant circuit, from the liquid state of aggregation into the gaseous state of aggregation and thereafter again back from the gaseous state of aggregation into the liquid state of aggregation.

The refrigerating apparatus may comprise a refrigerant compressor, a refrigerant liquefier and/or a refrigerant storage container. Preferably, heat energy from the refrigerant liquefier, which is thermally coupled to a ram air channel, is transported to ram air flowing through the ram air channel. The refrigerant storage container may be disposed in the refrigerant circuit of the refrigerating apparatus downstream of the refrigerant liquefier.

The ambient air flowing through the ambient air supply line may be cooled by means of an ambient air cooling device designed in the form of a refrigerant evaporator disposed in the refrigerant circuit of the refrigerating apparatus, preferably downstream of a first expansion valve. The compressed air flowing through the compressed air supply line may be cooled by means of a compressed air cooling device designed in the form of a refrigerant evaporator disposed in the refrigerant circuit of the refrigerating apparatus, preferably downstream of a second expansion valve.

Compressed air flowing through the compressed air discharge line may be cooled by means of a condenser disposed in the compressed air discharge line. Water may be separated from compressed air flowing through the compressed air discharge line by means of a water separator disposed in the compressed air discharge line. Compressed air flowing through the compressed air discharge line may be expanded by means of a compressed air turbine disposed in the compressed air discharge line, the compressed air turbine preferably being coupled to the refrigerant compressor of the refrigerating apparatus and driving the refrigerant compressor of the refrigerating apparatus.

Ambient air flowing through the ambient air discharge line may be supplied to the compressed air discharge line, wherein the ambient air discharge line preferably comprises a first ambient air discharge line branch opening into the compressed air discharge line upstream of the compressed air turbine and a second ambient air discharge line branch opening into the compressed air discharge line downstream of the compressed air turbine.

The supply of ambient air flowing through the ambient air discharge line into the first and the second ambient air discharge line branch may be controlled in dependence on a pressure of the ambient air flowing through the ambient air discharge line.

Ambient air flowing through the ambient air supply line may be compressed by means of an ambient air compressor disposed in the ambient air supply line, wherein the ambient air compressor preferably is coupled to the compressed air turbine so as to be driven by the compressed air turbine. Ambient air flowing through the ambient air supply line may be pre-cooled by means of an ambient air pre-cooler disposed in the ambient air supply line, wherein the ambient air pre-cooler preferably is thermally coupled to the ram air channel such that heat energy from the ambient air pre-cooler may be transported to ram air flowing through the ram air channel. Compressed air flowing through the compressed air supply line may be pre-cooled by means of a compressed air pre-cooler disposed in the compressed air supply line, wherein the compressed air pre-cooler preferably is thermally coupled to the ram air channel such that heat energy from the compressed air pre-cooler may be transported to ram air flowing through the ram air channel.

BRIEF DESCRIPTION OF THE DRAWINGS

A preferred embodiment of the invention now is described in greater detail with reference to the appended schematic drawings, wherein.

DETAILED DESCRIPTION OF THE PREFERRED EMBODIMENTS

Figure 1:
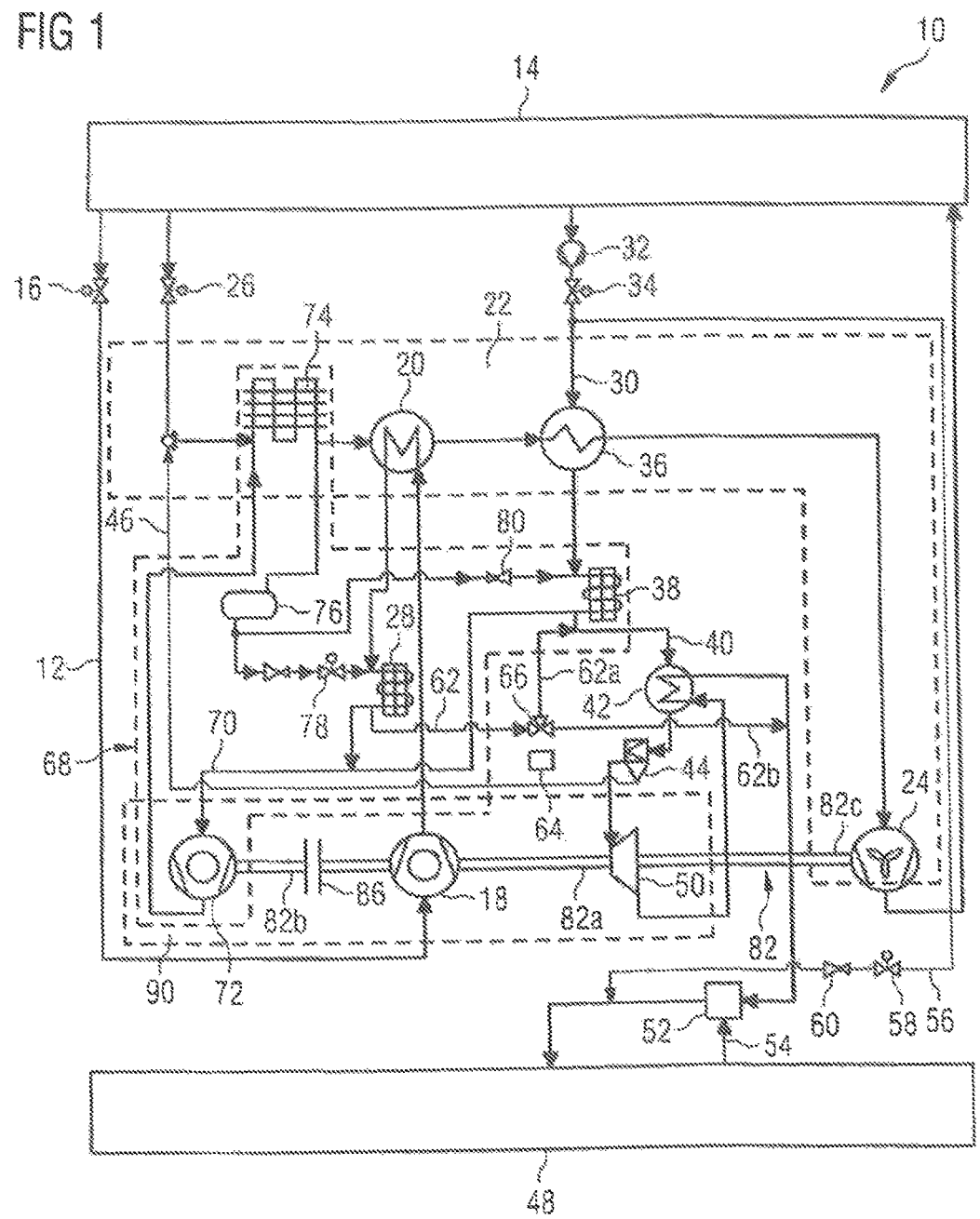
FIG. 1 shows a schematic representation of an aircraft air conditioning system.

An aircraft air conditioning system 10 according to FIG. 1 comprises an ambient air supply line 12. The supply of ambient air from an aircraft environment 14 into the ambient air supply line 12 is controlled by means of a valve 16. Downstream of the valve 16, an ambient air compressor 18 is disposed in the ambient air supply line 12 which serves to compress the ambient air flowing through the ambient air supply line 12.

Downstream of the ambient air compressor 18, an ambient air pre-cooler 20 is disposed in the ambient air supply line 12. The ambient air pre-cooler 20 serves to pre-cool the ambient air flowing through the ambient air supply line 12. The ambient air pre-cooler 20 is designed in the form of a heat exchanger which is disposed in a ram air channel 22. Thus, the ambient air supplied to the ambient air pre-cooler 20 via the ambient air supply line 12, in the ambient air pre-cooler 20, is cooled by transferring heat from the ambient air to the ram air flowing through the ram air channel 14.

During flight operation of an aircraft equipped with the aircraft air conditioning system 10, the ram air channel 22 is flown through with ambient air due to the pressure conditions building up in an inlet region and an outlet region of the ram air channel 22. Further, a conveying device 24 serves to convey ram air through the ram air channel 22, in particular during ground operation of a the aircraft. The supply of ambient air from an aircraft environment 14 into the ram air channel 22 is controlled by means of a ram air channel inlet flap 26.

Downstream of the ambient air pre-cooler 20, the ambient air supply line 12 opens into an ambient air cooling device 28. Upon flowing through the ambient air cooling device 28, the ambient air is cooled to a desired temperature.

Further, the aircraft air conditioning system 10 comprises a compressed air supply line 30. The compressed air supply line 30 is connected to an engine 32 the aircraft. The supply of compressed air into the compressed air supply line 30 is controlled by means of a valve 34. A compressed air pre-cooler 36 is disposed in the compressed air supply line 30. The compressed air pre-cooler 36 serves to pre-cool the ambient air flowing through the ambient air supply line 12. Like the ambient air pre-cooler 20, the compressed air pre-cooler 36 is designed in the form of a heat exchanger which is disposed in the ram air channel 22. Thus, the compressed air supplied to the compressed air pre-cooler 36 via the compressed air supply line 30, in the compressed air pre-cooler 36, is cooled by transferring heat from the compressed air to the ram air flowing through the ram air channel 14.

Downstream of the compressed air pre-cooler 36, the compressed air supply line 30 opens into a compressed air cooling device 38. Upon flowing through the compressed air cooling device 38, the compressed air is cooled to a desired temperature. The compressed air cooling device 88 is connected to a compressed air discharge line 40. A condenser 42 is disposed in the compressed air discharge line 40 which serves to further cool the compressed air exiting the compressed air cooling device 38.

Liquid water which condenses from the flow of compressed air upon being cooled in the compressed air cooling device 38 and the condenser 42 is separated from the compressed air flow in a water separator 44 which is disposed in the compressed air discharge line 40 downstream of the condenser 42. In the embodiment of an aircraft air conditioning system 10 according to FIG. 1, the water separator 44 is designed in the form of a high pressure separator. Liquid water separated from the compressed air flow in the water separator 44, via a water discharge line 46, is discharged into the ram air channel 22. In the ram air channel 22, the liquid water, together with the ram air flowing through the ram air channel 22, is conveyed through the ram air channel 22 and finally discharged to the aircraft environment 14.

The compressed air discharge line 40 connects the compressed air cooling device 38 to an aircraft cabin 48. Downstream of the water separator 44, a compressed air turbine 50 is disposed in the compressed air discharge line 40 which serves to expand the compressed air flowing through the compressed air discharge line 40 to a desired pressure, at which the compressed air may be supplied to the aircraft cabin 48. The air exiting the compressed air turbine 50 is guided to the condenser 42 so as to act as a heat sink for the compressed air exiting the compressed air cooling device 38. Hence, upon flowing through the condenser 42, the compressed air exiting the compressed air cooling device 38 is cooled by transferring heat to the air exiting the compressed air turbine 40.

Prior to being introduced into the aircraft cabin 48, the compressed air expanded in the compressed air turbine 50, in a mixing unit 52, is mixed with recirculation air recirculated into the mixing unit 52 from the aircraft cabin 48 via a recirculation air line 54. From the mixing unit 52, a mixture of air exiting the compressed air discharge line 40 and recirculation air finally is introduced into the aircraft cabin 48. A trim air line 56, wherein a control valve 58 for controlling a flow of trim air through the trim air line 56 and an expansion valve 60 are disposed, branches off from the compressed air supply line 30 upstream of the compressed air pre-cooler 36 and opens into the compressed air discharge line 40 downstream of the mixing unit 52.

The ambient air cooling device 28 is connected to an ambient air discharge line 62. The ambient air discharge line 62 opens into the compressed air discharge line 40 such that the ambient air exiting the ambient air discharge line 62 is supplied to the aircraft cabin 48 via the compressed air discharge line 40 and the mixing unit 52. The ambient air discharge line 62 comprises a first ambient air discharge line branch 62a opening into the compressed air discharge line 40 upstream of the compressed air turbine 50 and a second ambient air discharge line branch 62a opening into the compressed air discharge line 40 downstream of the compressed air turbine 50. Via the first ambient air discharge line branch 62a, ambient air flowing through the ambient air discharge line 62 may be supplied to a high pressure region of the compressed air discharge line 40. To the contrary, the second ambient air discharge line branch 62b serves to guide ambient air flowing through the ambient air discharge line 62 to a low pressure region of the compressed air discharge line 40.

Since the ambient air flowing through the ambient air supply line 12 and, after having passed the ambient air cooling device 28, the ambient air discharge line 62 is guided into the ambient air supply line 12 from the environment 14 of the aircraft, the pressure of the ambient air flowing through the ambient air supply line 12 and the ambient air discharge line 62 varies in dependence on the ambient pressure and hence the cruising altitude of an aircraft equipped with the aircraft air conditioning system 10. The aircraft air conditioning system 10 therefore further comprises a control unit 64 controls the supply of ambient air flowing through the ambient air discharge line 62 into the first and the second ambient air discharge line branch 62a, 62b in dependence on a pressure of the ambient air flowing through the ambient air discharge line 62.

In particular, the control unit 64, by suitably controlling a three way valve 66 disposed in the ambient air discharge line 62, provides for a supply of ambient air flowing through the ambient air discharge line 62 into the first ambient air discharge line branch 62a and further into a high pressure region of the compressed air discharge line 40, if the pressure of the ambient air flowing through the ambient air discharge line 62 exceeds a predetermined threshold value. Further, the control unit 64, again by suitably controlling the three way valve 66, provides for a supply of ambient air flowing through the ambient air discharge line 62 into the second ambient air discharge line branch 62b and further into a low pressure region of the compressed air discharge line 40, if the pressure of the ambient air flowing through the ambient air discharge line 62 is below a predetermined threshold value.

The aircraft air conditioning system 10 further comprises a refrigerating apparatus 68 which is equipped with a refrigerant circuit 70. A two-phase refrigerant, for example R134A (CH2F-CF3), CO2, R-245fa (1,1,1,3,3-Pentafluoropropane), or a low pressure HFC refrigerant, circulates through the refrigerant circuit 70 of the refrigerating apparatus 68. A refrigerant compressor 72 and a refrigerant liquefier 74 are disposed in the refrigerant circuit 70. A refrigerant storage container 76 is disposed in the refrigerant circuit 70 downstream of the refrigerant liquefier 74 which serves to receive and store refrigerant exiting the refrigerant liquefier 74 in the liquid state of aggregation. A first expansion valve 78 is disposed in the refrigerant circuit 70 upstream of the ambient air cooling device 28 and a second expansion valve 80 is disposed in the refrigerant circuit 70 upstream of the compressed air cooling device 38. The refrigerant compressor 72 is designed in the form of a radial compressor and serves to compress the two-phase refrigerant flowing through the refrigerant circuit 70. The refrigerant liquefier 74 is designed in the form of a heat exchanger and is disposed in the ram air channel 22 such that the two-phase refrigerant, upon flowing through the refrigerant liquefier 72, is cooled by transferring heat to the ram air flowing through the ram air channel 22.

The ambient air cooling device 28 and the compressed air cooling device 38 are designed in the form of a refrigerant evaporator disposed in the refrigerant circuit 70 of the refrigerating apparatus 68. Thus, the ambient air supplied to the ambient air cooling device 28 via the ambient air supply line 12, in the ambient air cooling device 28 is cooled by the cooling energy released by the two-phase refrigerant upon being converted from the liquid to the gaseous state of aggregation due to the transfer of thermal energy from the ambient air flowing through the ambient air supply line 12.

Similarly, the compressed air supplied to the compressed air cooling device 38 via the compressed air supply line 30, in the compressed air cooling device 38 is cooled by the cooling energy released by the two-phase refrigerant upon being converted from the liquid to the gaseous state of aggregation due to the transfer of thermal energy from the ambient air flowing through the compressed air supply line 30.

The ambient air cooling device 28 is designed in the form of a heat exchanger and provides for a thermal contact between the two-phase refrigerant flowing through the refrigerant circuit 70 of the refrigerating apparatus 68 and the ambient air supplied to the ambient air cooling device 28 via the ambient air supply line 12. Similarly, the compressed air cooling device 38 is designed in the form of a heat exchanger and provides for a thermal contact between the two-phase refrigerant flowing through the refrigerant circuit 70 of the refrigerating apparatus 68 and the compressed air supplied to the compressed air cooling device 38 via the compressed air supply line 30. The refrigerant circuit 58, however, is not in fluid communication with the ambient air or the compressed air.

Figure 2:
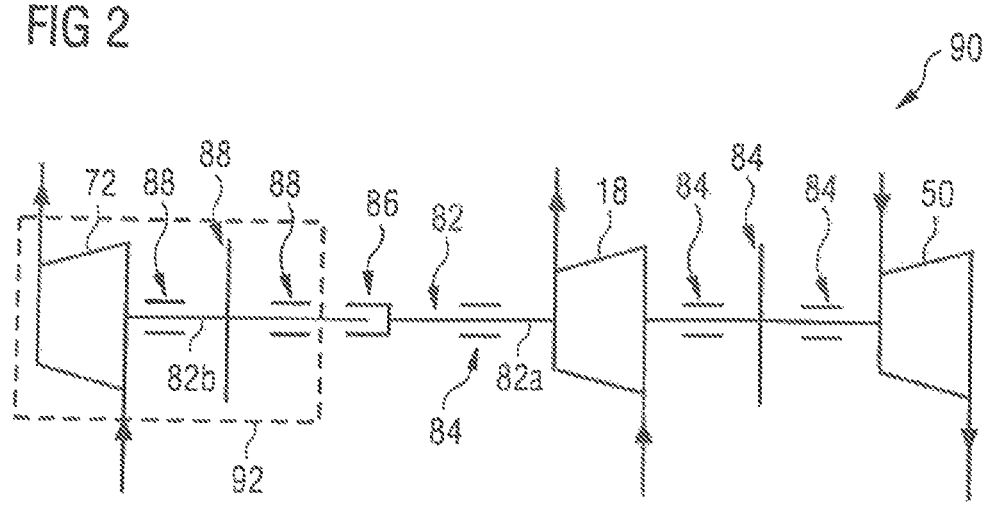
FIG. 2 shows a schematic representation of an arrangement of a compressed air turbine, an ambient air compressor and a refrigerant compressor which is employed in the aircraft air conditioning system of FIG. 1.

The compressed air turbine 50 and the ambient air compressor 18 are disposed on a common shaft 82 allowing the ambient air compressor 18 to be driven by the compressed air turbine 50 and to be operated at the same speed as the compressed air turbine 50. As becomes apparent in particular from FIG. 2, the compressed air turbine 50 and the ambient air compressor 18 are supported via fluid, air or magnetic bearings 84. Further, the compressed air turbine 50 and the refrigerant compressor 72 of the refrigerating apparatus 68 are coupled via a magnetic coupling 86 disposed between a shaft portion 82a carrying the compressed air turbine 50 as well as the ambient air compressor 18 and a shaft portion 82b carrying the refrigerant compressor 72 of the refrigerating apparatus 68. The magnetic coupling 86 allows the refrigerant compressor 72 of the refrigerating apparatus 68 and the compressed air turbine 50 to be operated at the same speed, wherein, however, slip of the magnetic coupling 86 provides for a limitation of the speed of the refrigerant compressor 72 in case a torque input into the refrigerant compressor 72 by the compressed air turbine 50 exceeds a predetermined maximum value. The refrigerant compressor 72 is supported on the shaft portion 82b via a magnetic bearing 88.

Figure 3:
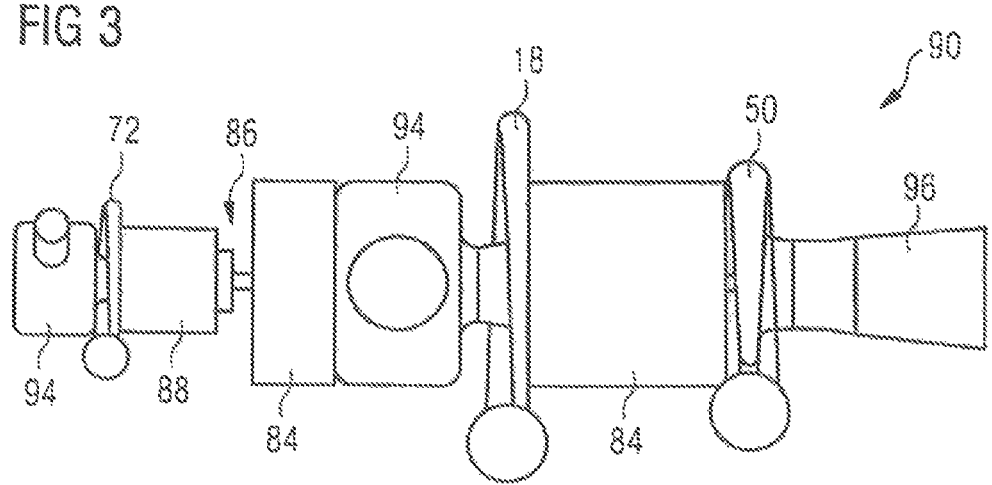
FIG. 3 shows a three-dimensional view of the arrangement depicted in FIG. 1.

As shown in FIG. 3, the compressed air turbine 50, the ambient air compressor 18 and the refrigerant compressor 72 constitute components of an assembly 90 which is of a compact design and hence requires only a small installation space. The assembly including the compressed air turbine 50, the ambient air compressor 18 and the refrigerant compressor 72 is connected to a shaft portion 82c carrying the conveying device 24 for conveying ram air through the ram air channel 22 (see FIG. 1). Hence, also the conveying device 24 for conveying ram air through the ram air channel 22 is disposed on a common shaft with the compressed air turbine 50 and therefore also is driven by the compressed air turbine 50 and operated at the same speed as the compressed air turbine 50.

As shown in FIG. 3, the refrigerant compressor 72 of the hermetically sealed housing 92 comprises a hermetically sealed housing 92. The hermetically sealed housing 92 prevents refrigerant circulating in the refrigerant circuit 70 of the hermetically sealed housing 92 from exiting the housing 92. Since the refrigerant compressor 72 is coupled to the compressed air turbine 50 in a contact-free manner via the magnetic coupling 86, the hermetically sealed housing 92 might also be designed so as to provide for a static sealing. The refrigerant compressor 72 and the ambient air compressor 18 are provided with radially oriented inlets 94. An outlet of the compressed air turbine 50 comprises a conical axial diffuser 96, but may also be provided with a radial diffuser.

During operation of the aircraft air conditioning system 10, a mixture of cooled and expanded compressed air bled of from the aircraft engine 32 and cooled ambient air is supplied to the mixing unit 52. Thus the amount of compressed air bled of from the aircraft engine 32 and hence the fuel consumption of the aircraft can be reduced.

Further, the required fresh air supply into the aircraft cabin 48 can be ensured. Moreover, due to the high cooling capacity of the refrigerating apparatus 68 being operated with a two-phase refrigerant, the aircraft air conditioning system 10 may be operated with particularly high energy efficiency.

As is apparent from the foregoing specification, the invention is susceptible of being embodied with various alterations and modifications which may differ particularly from those that have been described in the preceding specification and description. It should be understood that I wish to embody within the scope of the patent warranted hereon all such modifications as reasonably and properly come within the scope of my contribution to the art.

The invention claimed is:

1. An aircraft air conditioning system comprising:
   an ambient air supply line allowing a flow of ambient air therethrough,
   an ambient air cooling device connected downstream of the ambient air supply line and being adapted to cool the ambient air flowing through the ambient air supply line,
   an ambient air discharge line connected to the ambient air cooling device and being connectable to an aircraft cabin,
   a compressed air supply line allowing a flow of compressed air therethrough,
   a compressed air cooling device connected to the compressed air supply line and being adapted to cool the compressed air flowing through the compressed air supply line,
   a compressed air discharge line connected to the compressed air cooling device and being connectable to the aircraft cabin,
   a condenser disposed in the compressed air discharge line downstream of the compressed air cooling device,
   a compressed air turbine disposed in the compressed air discharge line, and
   a refrigerating apparatus comprising a refrigerant circuit allowing the flow of a two-phase refrigerant therethrough and being configured to convert the two-phase refrigerant, upon flowing though the refrigerant circuit, from the liquid state of aggregation into the gaseous state of aggregation and thereafter again back from the gaseous state of aggregation into the liquid state of aggregation, the refrigerant circuit of the refrigerating apparatus being adapted to supply cooling energy to the ambient air cooling device and the compressed air cooling device,
   wherein the ambient air discharge line comprises a first ambient air discharge line branch opening into the compressed air discharge line upstream of the condenser, and wherein air exiting the compressed air turbine is supplied to the condenser as a heat sink for the compressed air exiting the compressed air cooling device.

2. The aircraft air conditioning system according to claim 1, wherein the refrigerating apparatus comprises at least one of a refrigerant compressor, a refrigerant liquefier and a refrigerant storage container, wherein the refrigerant liquefier is thermally coupled to a ram air channel to transport heat energy from the refrigerant liquefier to ram air flowing through the ram air channel, and wherein the refrigerant storage container is disposed in the refrigerant circuit of the refrigerating apparatus downstream of the refrigerant liquefier.

3. The aircraft air conditioning system according to claim 1, wherein at least one of the ambient air cooling device and the compressed air cooling device is in the form of a refrigerant evaporator disposed in the refrigerant circuit of the refrigerating apparatus, wherein the ambient air cooling device is disposed in the refrigerant circuit of the refrigerating apparatus downstream of a first expansion valve, and wherein the compressed air cooling device is disposed in the refrigerant circuit of the refrigerating apparatus downstream of a second expansion valve.

4. The aircraft air conditioning system according to claim 1, further comprising:
   a water separator disposed in the compressed air discharge line.

5. The aircraft air conditioning system according to claim 1, wherein the ambient air discharge line opens into the compressed air discharge line and comprises a first ambient air discharge line branch opening into the compressed air discharge line upstream of the compressed air turbine and a second ambient air discharge line branch opening into the compressed air discharge line downstream of the compressed air turbine.

6. The aircraft air conditioning system according to claim 5, further comprising a control unit adapted to control the supply of ambient air flowing through the ambient air discharge line into the first and the second ambient air discharge line branch in dependence on a pressure of the ambient air flowing through the ambient air discharge line.

7. The aircraft air conditioning system according to claim 1, further comprising at least one of:
   an ambient air compressor disposed in the ambient air supply line and being coupled to the compressed air turbine so as to be driven by the compressed air turbine,
   an ambient air pre-cooler disposed in the ambient air supply line and being thermally coupled to the ram air channel so as to transport heat energy from the ambient air pre-cooler to ram air flowing through the ram air channel, and
   a compressed air pre-cooler disposed in the compressed air supply line and being thermally coupled to the ram air channel so as to transport heat energy from the compressed air pre-cooler to ram air flowing through the ram air channel.

8. The aircraft air conditioning system according to claim 4, wherein
   the compressed air turbine and the ambient air compressor are arranged on a common shaft,
   the compressed air turbine is coupled to the refrigerant compressor of the refrigerating apparatus via a magnetic coupling, and
   at least the refrigerant compressor of the refrigerating apparatus comprises a hermetically sealed housing.

9. A method of operating an aircraft air conditioning system comprising the steps:
- guiding a flow of ambient air through an ambient air supply line,
- cooling the ambient air flowing through the ambient air supply line with an ambient air cooling device,
- supplying the ambient air cooled by the ambient air cooling device into an ambient air discharge line downstream of the ambient air cooling device, the ambient air discharge line being connectable to an aircraft cabin,
- guiding a flow of compressed air through a compressed air supply line,
- cooling the compressed air flowing through the compressed air supply line with a compressed air cooling device,
- supplying the compressed air cooled by the compressed air cooling device into a compressed air discharge line which is connectable to the aircraft cabin,
- condensing by a condenser the compressed air in the compressed air discharge line downstream of the compressed air cooling device, and
- supplying cooling energy to the ambient air cooling device and the compressed air cooling device from a refrigerant circuit of a refrigerating apparatus, the refrigerant circuit allowing the flow of a two-phase refrigerant therethrough, and the refrigerating apparatus being designed to convert the two-phase refrigerant, upon flowing though the refrigerant circuit, from the liquid state of aggregation into the gaseous state of aggregation and thereafter again back from the gaseous state of aggregation into the liquid state of aggregation, wherein
- the ambient air discharge line comprises a first ambient air discharge line branch opening into the compressed air discharge line upstream of the condenser,
- wherein air exiting a compressed air turbine in the compressed air discharge line is supplied to the condenser as a heat sink for the compressed air exiting the compressed air cooling device.

10. The method according to claim 9, wherein the refrigerating apparatus comprises at least one of a refrigerant compressor, a refrigerant liquefier and a refrigerant storage container, wherein heat energy from the refrigerant liquefier, which is thermally coupled to a ram air channel, is transported to ram air flowing through the ram air channel, and wherein the refrigerant storage container is disposed in the refrigerant circuit of the refrigerating apparatus downstream of the refrigerant liquefier.

11. The method according to claim 9, wherein the ambient air flowing through the ambient air supply line is cooled by means of an ambient air cooling device designed in the form of a refrigerant evaporator disposed in the refrigerant circuit of the refrigerating apparatus, downstream of a first expansion valve, and wherein the compressed air flowing through the compressed air supply line is cooled by a compressed air cooling device designed in the form of a refrigerant evaporator disposed in the refrigerant circuit of the refrigerating apparatus, downstream of a second expansion valve.

12. The method according to claim 10, further comprising at least one of:
- cooling compressed air flowing through the compressed air discharge line with a condenser disposed in the compressed air discharge line,
- separating water from compressed air flowing through the compressed air discharge line with a water separator disposed in the compressed air discharge line,
- expanding compressed air flowing through the compressed air discharge line with a compressed air turbine disposed in the compressed air discharge line, the compressed air turbine being coupled to the refrigerant compressor of the refrigerating apparatus and driving the refrigerant compressor of the refrigerating apparatus.

13. The aircraft air conditioning system according to claim 9, wherein the supply of ambient air flowing through the ambient air discharge line into the first and the second ambient air discharge line branch is controlled in dependence on a pressure of the ambient air flowing through the ambient air discharge line.

14. The method according to claim 9, further comprising at least one of:
- compressing ambient air flowing through the ambient air supply line via an ambient air compressor disposed in the ambient air supply line, wherein the ambient air compressor is coupled to the compressed air turbine so as to be driven by the compressed air turbine,
- pre-cooling ambient air flowing through the ambient air supply line by means of an ambient air pre-cooler disposed in the ambient air supply line, wherein the ambient air pre-cooler is thermally coupled to the ram air channel to transport heat energy from the ambient air pre-cooler to ram air flowing through the ram air channel, and
- pre-cooling compressed air flowing through the compressed air supply line with a compressed air pre-cooler disposed in the compressed air supply line, wherein the compressed air pre-cooler is thermally coupled to the ram air channel to transport heat energy from the compressed air pre-cooler to ram air flowing through the ram air channel.

15. The aircraft air conditioning system according to claim 2, wherein the compressed air turbine is driven by the compressed air flowing through the compressed air discharge line and is coupled to the refrigerant compressor of the refrigerating apparatus so as to drive the refrigerant compressor of the refrigerating apparatus.

16. An aircraft air conditioning system comprising:
- an ambient air supply line allowing a flow of ambient air therethrough,
- an ambient air cooling device connected to the ambient air supply line and being adapted to cool the ambient air flowing through the ambient air supply line,
- an ambient air discharge line connected to the ambient air cooling device and being connectable to an aircraft cabin,
- a compressed air supply line allowing a flow of compressed air therethrough,
- a compressed air cooling device connected to the compressed air supply line and being adapted to cool the compressed air flowing through the compressed air supply line,
- a compressed air discharge line connected to the compressed air cooling device and being connectable to the aircraft cabin,
- a compressed air turbine disposed in the compressed air discharge line, and
- a refrigerating apparatus comprising a refrigerant circuit allowing the flow of a two-phase refrigerant therethrough and being configured to convert the two-phase refrigerant, upon flowing though the refrigerant circuit, from the liquid state of aggregation into the gaseous state of aggregation and thereafter again back from the gaseous state of aggregation into the liquid state of aggregation, the refrigerant circuit of the refrigerating apparatus being adapted to supply cooling energy to the ambient air cooling device and the compressed air cooling device, wherein the refrigerant circuit branches into two lines for supplying cooling energy to the ambient air cooling device and the compressed air cooling device, respectively, wherein air exiting the compressed air turbine is supplied to a condenser as a heat sink for the compressed air exiting the compressed air cooling device, and wherein the two lines for supplying cooling energy comprise respective expansion valves upstream of the ambient air cooling device and the compressed air cooling device.

17. The aircraft air conditioning system according to claim 1, wherein the ambient air discharge line comprises a second ambient air discharge line branch opening into a low pressure region of the compressed air discharge line.

18. The aircraft air conditioning system according to claim 17, further comprising a three way valve that controls the supply of ambient air into the first ambient air discharge line and the second ambient air discharge line based on a pressure of the ambient air flowing through the ambient air discharge line.

19. The aircraft air conditioning system according to claim 1, wherein the ambient air discharge line comprises a second ambient air discharge line branch which is mixed with air that was supplied to the condenser as the heat sink.

* * * * *